United States Patent Office 2,896,419
Patented July 28, 1959

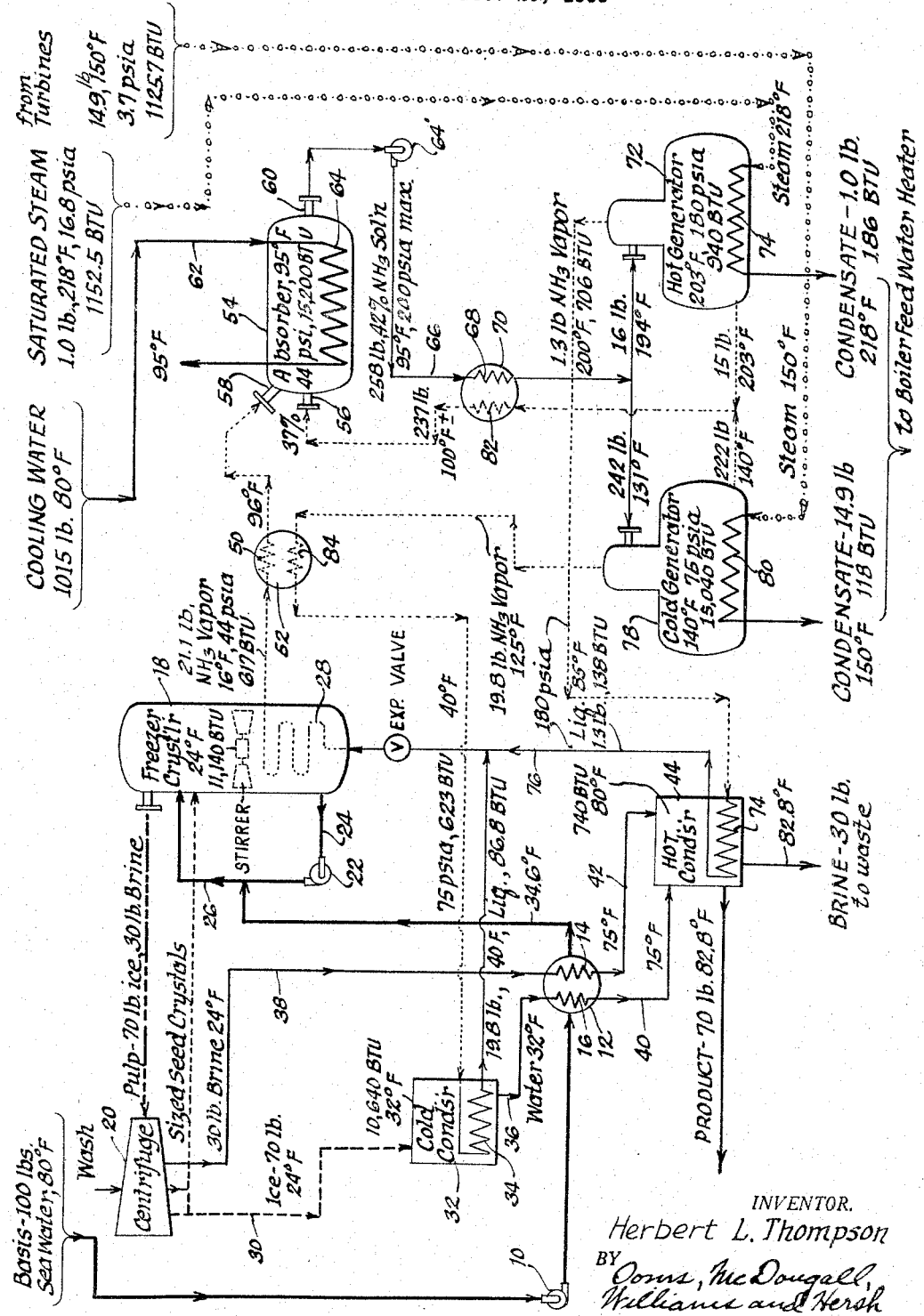

2,896,419

FRESH WATER RECOVERY PROCESS AND APPARATUS FOR USE IN SAME

Herbert L. Thompson, Birmingham, Ala.

Application December 20, 1955, Serial No. 554,174

8 Claims. (Cl. 62—58)

This invention relates to the recovery of fresh water from available sources of water which may contain undesirable salts in solution therein and it relates more particularly to the recovery of fresh water from the sea and the means for achieving same in an efficient and economical manner, and it is an object of this invention to provide a method for use in the practice of same.

More specifically, it is an object of this invention to provide a process for the recovery of fresh water from the sea wherein use is made of low-level heat such as is available in the form of steam as waste from power plants and the like, as the source of energy required for conversion and wherein the process can be carried out as a unit operation which requires a minimum amount of material and equipment.

These and other objects and advantages of this invention will hereinafter appear and for purposes of illustration, but not of limitation, an embodiment of the invention is shown in the accompanying drawing in which—

Figure 1 is a flow sheet of the process in which reference is made to a typical set of conditions.

The winning of fresh water from ocean sources has been the subject of intense research and investigation over many years. Various means have been proposed including freezing pure ice crystals followed by the separation of crystals from the residual brine and then remelting the ice to produce fresh water, as described in the article entitled "Demineralization of Saline Waters" published by the United States Department of Interior, October 1952, or including vapor compression distillation systems which have appeared more promising than the crystallization method because of the difficulty in the latter of obtaining pure ice crystals without brine inclusions and because of the inherently low thermal efficiency of a refrigeration process for use in ice formation wherein a net expenditure of about 26 kilowatt hours per 1000 gallons of product is required.

To the best of my knowledge, no one before has taught or suggested the concepts employed in accordance with the practice of this invention wherein fresh water is economically and efficiently recovered from the sea by the use of an absorption refrigeration system for ice production relying on low-level heat available as waste from other energy-using sources such as a power plant cycle for refrigerant-solute circulation and which makes use of the formed ice crystals for refrigerant condensation upon remelting of the ice to form fresh water thereby to provide a new and novel arrangement of steps and elements for producing fresh water from ocean sources at low cost and with energy that is freely available for use.

For a better understanding of the invention, prior to detailed discussion of the steps and conditions thereof, a description will hereinafter be made of the process with reference to the flow sheet of Figure 1. In this description, a set of conditions will be assumed by way of approximation of a typical operation but it will be understood that the conditions may vary in some degree, as will hereinafter be pointed out.

*Sea water cycle*

Sea water (100 pounds), assumed to be at 80° F., is withdrawn from the sea and circulated by the pump 10 through a heat exchanger 12 in heat exchange relation with the cold brine (30 pounds) circulated through the heat exchanger 12 in coils 14 and in heat exchange relation with the cold water (70 pounds) formed by remelting the crystals of ice and circulated through the heat exchanger in coil 16 at a temperature of about 32° F. In the heat exchanger 12, the sea water is reduced to a temperature of about 34–35° F. while the brine in coil 14 and the remelted crystals of ice in coil 16 are heated to a temperature of approximately 70–75° F.

From the heat exchanger 12, the sea water (100 pounds) at about 34–35° F. is advanced through suitable pipes or conduits to a freezer-crystallizer 18 which operates on a system of controlled supersaturation and which relies upon control of crystal habit and nucleation to produce a relatively pure crystal of ice having little, if any, brine inclusions. Nucleation is controlled for example, by recycling sized crystals of ice from the centrifuge 20 or other separating means which will hereinafter be described. Instead of seed crystals of ice, use can be made of other particles of inert material for nucleation control, such as silica, in the freezer-crystallizer. In operation, the sea water is circulated by the pump 22 from the bottom of the freezer-crystallizer to an upper portion thereof through suitable conduits 24 and 26 to control the supersaturation and crystal habit whereby a relatively pure crystal of ice is formed without brine inclusions. The material within the freezer-crystallizer is refrigerated by the use of a refrigerant system operating on an evaporation cycle through coils 28, as will hereinafter be described.

In the freezer-crystallizer 18, the brine is reduced in temperature by the refrigerant to about 24° F. At this temperature, approximately 70 percent of the weight of the sea water will be reduced to relatively pure crystals of ice and the brine comprising the remaining 30 percent will contain practically all of the original salt in the sea water (about 3.5 percent).

The pulp from the freezer-crystallizer composed of ice crystals (70 pounds) and brine (30 pounds) is advanced from the freezer-crystallizer to the centrifuge 20. The separated crystals of ice are adavnced through the conduit 30 to a cold condenser 32 into heat exchange relation with ammonia vapors (19.8 pounds) at 40° F. and about 75 p.s.i.a. pressure which is circulated through the cold condenser through coils 34 to condense the ammonia vapors and produce an equivalent amount of liquid ammonia at about 40° F. while the crystals of ice within the condenser are melted to produce fresh water (70 pounds) at about 32° F.

The fresh water at about 32° F. and the residual brine (30 pounds) from the centrifuge at 24° F. are advanced through separate conduits 36 and 38, respectively, into the coils 16 and 14, respectively, of the heat exchanger 12 in heat exchange relation with the incoming sea water 28 to cool the sea water, as previously described, from 80° F. down to about 32–34° F., while both the brine and the fresh water are heated up to about 75° F. Both the brine (30 pounds) and fresh water (70 pounds) at about 75° F. are advanced through separate conduits 40 and 42 through a hot condenser 44 in heat exchange relation with the vapors of the refrigerant such as ammonia at 200° F. and 180 p.s.i.a. The vapors (1.3 pounds) of the refrigerant are cooled for liquefaction at 85° F. while the fresh water (70 pounds) heated to about 82–83° F. is led off in one direction for use while the brine (30 pounds) at the same temperature is led off in another direction as waste. Thus the sea water is separated into a fresh water component for use and into brine which can be either discarded or else processed further for the recovery of the salts, iodine, and various metals and compounds available from the solubles present in sea water, as is well recognized in the chemical industry.

The refrigeration cycle

The refrigeration cycle which operates in combination with the recovery of fresh water from the sea is a self-contained system in which ammonia is used as representative of a refrigerant in the described process. It will be understood that other refrigerants operating on a system based upon vaporization of a substance from its solution for cooling can be used, such as Freon, propylene, methyl chloride, ethyl chloride, methyl bromide and the like.

In the system described, in which use is made of ammonia as a refrigerant, the ammonia (21.1 pounds) issuing from the coils 28 of the freezer-crystallizer 18 at about 16° F. and 44 p.s.i.a. is advanced through the coils 50 of the heat exchanger 52 in heat exchange relation with ammonia vapors (19.8 pounds) at 125° F. to cool the latter down to 40° F. while the vapor under pressure from the freezer-crystallizer is heated up to a temperature of about 96° F. From the heat exchanger 52, the ammonia vapor at 44 p.s.i.a. and 96° F. is introduced into an absorber 54 which is simultaneously fed through inlet 56 with a solution of ammonium hydroxide (237 pounds) at 100° F. and containing about 37 percent $NH_3$.

The free ammonia vapors introduced into the absorber through the inlet 58 are dissolved or absorbed into the solution of ammonium hydroxide to produce an effluent issuing from the outlet 60 having 42 percent $NH_3$.

The concentration of ammonia capable of being absorbed is dependent somewhat upon the temperature of the materials in the absorber and in order to maintain the temperature of the absorber at a relatively low level, the absorber can be cooled by sea water, assumed to be 80° F., which is circulated by means of a pump (not shown) through the conduits 62 and the coils 64 in the absorber and then returned to the sea as waste. In the described illustration, the absorber is maintained at a temperature of about 95° F. The heat of absorption is taken up by the sea water which enters the absorber at 80° F. and leaves the absorber at a temperature of about 95° F.

From the absorber, the effluent (280 pounds) containing 42 percent $NH_3$ at 95° F. and 44 p.s.i.a. is compressed to 200 p.s.i.a. and circulated by the pump 64' through the conduits 66 into the coils 68 of a heat exchanger 70 in heat exchange relation with the 37 percent ammonium hydroxide solution being advanced to the absorber wherein the 37 percent solution of ammonium hydroxide is cooled in the heat exchanger from a temperature of about 140° F. to a temperature of about 100° F. while the effluent containing 42 percent $NH_3$ is heated from the temperature of 95° F. to a higher temperature of a range of about 131° F.

In the preferred practice, a small increment (16 pounds) of the 42 percent $NH_3$ solution is separated out from the remainder for advancement to a hot generator 72. The hot generator is provided with coils 74 through which saturated steam, as from a steam turbine, at a pressure of about 16.8 p.s.i.a. and 218° F. is circulated. The steam operates to heat the materials in the hot generator to temperature of about 203° F. while the pressure is maintained at about 180 p.s.i.a. Under these conditions, ammonia (1.3 pounds) is driven off as a vapor at about 200° F. while the residue which corresponds to about 37 percent ammonium hydroxide solution at 203° F. is recirculated to the absorber 54 through the heat exchanger 70, as previously described.

The released ammonia vapors (1.3 pounds) at about 200° F. and 180 p.s.i.a is advanced directly to the hot condenser 44 having coils 74 through which the ammonia vapors are circulated and wherein the ammonia vapors are cooled down to a temperature of about 185° F. as the vapor passes in heat exchange relation with the fresh water and brine. Under these conditions, the ammonia vapors are condensed to a liquid which is forwarded through the conduit 76 to the evaporation coils 28 of the freezer-crystallizer.

The other and larger increment of the solution of 42 percent $NH_3$ at about 131° F. and 200 p.s.i.a. is advanced to a cold generator 78. The latter is provided with coils 80 through which saturated steam, as from the power turbine, is circulated at a temperature of about 150° F. and about 3.7 p.s.i.a. to maintain the materials in the cold generator at about 140° F. and 75 p.s.i.a. Under these conditions, ammonia vapors which have been absorbed are driven off. The residue of about 37 percent ammonium hydroxide at about 140° F. is circulated from the cold generator through the coils 82 of the heat exchanger 70 and then fed back into the absorber for reabsorbing ammonia vapors released by the freezer-crystallizer, as previously described. The released ammonia vapors (19.8 pounds) at about 125° F. and 75 p.s.i.a are advanced through the coils 84 of the heat exchanger 52 in heat exchange relation with ammonia vapors traveling from the freezer-crystallizer to the absorber to heat the latter from about 16° F. to about 96° F. while the vapors from the cold generator 78 are cooled from 125° F. to about 40° F.

The latter increment of ammonia vapor (19.8 pounds) at about 40° F. and 75 p.s.i.a. is advanced through the coils 34 of the cold condenser 32 to melt the ice crystals while the vapors are in exchange condensed to a liquid. This liquid can be rejoined with the condensed liquid from the hot condenser 44 for passage through the coils 28 of the vaporizer in the freezer-crystallizer 18 to cool the sea water to a temperature below freezing, preferably to a temperature of about 24° F. and thereby to complete the refrigerant cycle.

The steam cycle

The steam cycle can be employed as a self-contained system wherein the latent heat of the steam is removed for heating the concentrated solutions of ammonium hydroxide in the hot generator 72 and in the cold generator 78 to drive off some of the ammonia vapors and then the condensate formed as a residue of the steam from the cold generator and the hot generator can be returned to the boiler feed water heater for regeneration of steam for driving the turbine. In the alternative, the condensate may be discarded.

As indicated in the flow sheet, steam, such as is made available from the exhaust of a steam turbine at 218° F., is passed through the coils 74 of the hot generator to heat the ammonia solution to a temperature sufficient to drive off absorbed $NH_3$ and the condensate at about 218° F. is drained from the coils for use as described. Another increment of steam is passed into the coils 80 of the cold generator 78 for heating the ammonia solution to a temperature for driving off absorbed ammonia vapors and again the condensate is drained from the coils for return as boiler feed water or the like.

While description has been made of a system in which the solution of absorbed gases is subdivided for treatment separately in a hot generator 72 and a cold generator 78 for the purpose of driving off absorbed ammonia gases which are cycled to different units for use and then combined for passage as a liquid refrigerant through the evaporation coils 38 of the freezer-crystallizer 18, it will be understood that the solution of absorbed gaseous refrigerant may be treated solely in a hot generator or in a cold generator of the type described to drive off absorbed gases, which can thereafter be divided, if desired, for their separate function and then recombined as a condensate for passage through the vaporization coils of the freezer-crystallizer.

For winning of fresh water, it is preferred in the freezer-crystallizer to reduce the temperature of the sea water to about 24° F. because, at that temperature, about 70 percent by weight of the sea water is converted to ice crystals. Cooling to lower temperatures may be employed but the efficiency falls off because the increment of ice formation per unit drop in temperature below 24° F. falls off sharply. On the other hand, ice fromation in amount sufficient for economic and efficient operation does not occur at temperatures above about 28° F. Thus, for purposes of practical operation, it is desirable broadly to define the temperature limitations for cooling the sea water in the freezer-crystallizer as less than 28° F. and preferably to a temperature of about 24° F.±4° F.

If salt recovery is a separate object, lower temperatures may profitably be used, with the process principles herein disclosed otherwise being unchanged.

The evaporation temperature of the refrigerant in the coils 28 depends upon the temperature selected for ice formation in the freezer-crystallizer. For example, in the ammonia system of the illustrated process, a temperature differential of 8° F. is provided so that the liquid ammonia evaporates to provide a temperature of about 16° F. A temperature differential of 8° F. is quite low for most refrigeration cycles but is appears to be quite satisfactory to provide an efficient operation in sea water processing. Proper selection of a temperature differential between the refrigerated sea water and the evaporation temperature for the refrigerant depends greatly upon the type of refrigerant employed, the materials of construction, fuel cost, ambient water temperature and ambient air temperature, all of which depend somewhat on the specific location and will vary from place to place. It will be understood that other refrigerants of the type previously indicated suitable for use under the temperature conditions described may be employed instead of ammonia and it will be further understood that a temperature differential varying from 8° F. may be employed but it is preferred to make use of a temperature differential as small as feasible, and usually less than 30–35° F.

Other temperature and pressure conditions existing elsewhere in the system are somewhat controlled by the described conditions as well as existing conditions. For example, the amount of ammonia capable of being absorbed in the ammonium hydroxide solution in the absorber 54 depends upon the pressure of the ammonia vapors advanced from the freezer-crystallizer and upon the temperature in the absorber as controlled by the available cooling water circulated through the absorber. Where higher vapor pressures are available or where cooling water at lower temperatures is available for use to reduce the temperature in the absorber still further than 95° F., the amount of NH₃ vapors absorbed in the aqueous system of ammonium hydroxide will increase beyond 42%, as in the illustrated process. The amount can be determined accurately from tables readily available in the published literature. Thus, the amount of NH₃ absorbed and the concentration of NH₃ in the effluent from the absorber 54 may be varied.

The melting point of 32° F. for the ice crystals separated by the centrifuge 20 fixes the pressure required of the ammonia vapors for condensation of the ammonia vapors during passage through the coils 34 of the cold condenser 32. Thus pressure of about 75 p.s.i.a. or more and the concentration of NH₃ in the effluent from the absorber determines the boiling point temperature required in the cold generator 78 to drive off the ammonia vapors from the aqueous system, as previously described.

The boiling point of the solution containing the absorbed NH₃ in the cold generator 78 in turn more or less determines the pressure and temperature at which the steam should be supplied from the turbine cycle or from other available sources.

Similarly, the conditions of pressure and temperature of the auxiliary refrigerant cycle formed of the hot generator 72 and hot condenser 44 are capable of being determined one with respect to the other.

It should be understood that the process described herein is not limited in any way by the temperature of the sea water since any change in the conditions caused by a variation in the temperature of the sea water will only be relative thereto. In the fractionation system, less cold would be required to reduce the sea water to a temperature of about 24° F. in the event that the sea water temperature is lower from the start. Similarly, the amount of vapor absorbed in the absorber 54 would be increased in the refrigeration condensing cycle in the event that sea water at lower temperature is available.

Ammonia vapor quality issuing from the generators 72 and 78 will usually be less than 100 percent but will be so close thereto that correction has not been made therefore in the illustrated conditions except that its heat of vaporization has been included in the generator steam requirements. A small amount of vapor cooling by the incoming strong solution is assumed to exist. Further cooling of vapor from the primary generator 78 by interchange with the cold vapor from the freezer-crystallizer in the heat exchanger 52 is employed for the purpose of conserving low temperature and thereby increasing the efficiency and condensation capacity from the ice. Heat interchange between the effluent from the absorber 54 and the weaker solutions available from the cold generator 78 or the hot generator 72 by means of the heat exchanger 70 provides a maximum temperature for the stronger solution which is above its boiling point at generator pressures. This is made possible by maintaining the effluent at higher pressure during such interchange and then throttling it down to generator pressure thereby to conserve steam heat and maximizes water yield per pound of steam.

In the described illustration, the heat balances which are given are set forth by way of approximation only. The absorber heat balance assumes that the first absorption of vapor into the weak solution results in a higher temperature at the same pressure so that the differential will be considerably more than is indicated by the inlet and outlet temperatures of the steam.

One of the principal advantages available from the process which is described resides in the relative independence of the process of mechanical energy and in its high net thermal efficiency. In addition, corrosion and scaling can be held to a minimum where the sea water does not rise above ambient temperature, except in the absorber where, in any event, the power plant must tolerate a rise in cooling water temperature.

The production of fresh water from the sea by use of low-level waste heat in the manner described to freeze a fraction of sea water followed by the separation of the ice crystals from the brine and remelting the ice to condense refrigerant leads to important advantages from the standpoint of energy and from the standpoint of cost in equipment over processes which have heretofore been devised. Improvements in the efficiency of operation are believed to result from the combination of the refrigeration cycle with the fractionation cycle and between the refrigeration cycle and the heat cycle, such for example as when use is made of the melting ice crystals to effect condensation of the refrigerant and wherein use is made of steam from a turbine cycle to regenerant refrigerant vapors from an absorbent and wherein use is made of the combinations of steps described arranged in a new and novel manner one in combination with the other to produce fresh water from sea water by an ice fractionation system which makes use of an absorption refrigeration cycle in an economical and efficient manner,

I claim:
1. In the method of recovering fresh water from the sea, the combination of a water cycle, a refrigeration cycle operating on an evaporation-absorption system, and a steam cycle, wherein the water cycle comprises the steps of withdrawing water from the sea, extracting heat from the water in a freezer-crystallizer by passing the sea water in heat exchange relation with an evaporator in the refrigeration cycle in which a liquid refrigerant is vaporized with resultant drop in temperature to extract heat from the sea water and cool the water to a temperature below freezing, agitating the refrigerated sea water while in a supersaturated state within the freezer-crystallizer to cause formation of ice crystals substantially free of inclusions of brine to produce a pulp formed of a mixture of ice crystals and brine removing the pulp from the freezer-crystallizer, separating the ice crystals from the brine in the pulp removed and remelting the separated ice crystals by passing the ice crystals in heat exchange relation with refrigerant vapors; wherein the refrigeration cycle comprises the steps of absorbing the vapors released upon vaporization of the refrigerant during passage in heat exchange relation with the sea water into a solution of the refrigerant to produce a solution containing the refrigerant in higher concentration, heating the concentrated solution with latent heat available from steam to regenerate absorbed vapors, recirculating the resulting less concentrated solution from the regenerator to the absorber for reabsorption of additional vapors made available from the vaporizer, passing the vapors released from the concentrated solution in heat exchange relation with the vapors released from the evaporator to raise the temperature of the latter while cooling down the regenerated vapors, passing vapors made available from the generator in heat exchange relation with the ice crystals separated from the brine in the sea water cycle to reduce the ice crystals to water and to condense the refrigerant vapors to form a liquid refrigerant, and advancing the liquid refrigerant to the evaporator for extraction of heat from the sea water, and wherein the steam cycle comprises the steps of passing the steam in heat exchange relation with the concentrated solution of absorbed vapors to regenerate the vapors.

2. In the method of recovering fresh water from the sea, the combination of a water cycle, a refrigeration cycle operating on an evaporation-absorption system, and a steam cycle, wherein the water cycle comprises the steps of withdrawing water from the sea for extracting heat from the sea water in a first heat exchanger by passing the water in heat exchanger relation with the cold brine separated from the ice crystals to extract heat from the sea water with the cold available in the brine, passing the cooled sea water from the first heat exchange step into a freezer-crystallizer wherein the cooled sea water is passed in direct heat exchange relation with a refrigeration coil in which liquid refrigerant is vaporized controlling the temperature differential between the sea water and the vaporized refrigerant to reduce the temperature of the brine to below freezing whereby a supersaturated solution of salt in water is secured, crystallizing ice from the brine to produce a pulp formed of a mixture of ice crystals and brine, removing the pulp from the freezer-crystallizer separating the ice crystals from the brine in the pulp removed from the freezer-crystallizer and remelting the separated ice crystals by passing the ice crystals in heat exchange relation with refrigerant vapors; wherein the refrigeration cycle comprises the steps of absorbing the vapors while under pressure released upon vaporization of the refrigerant during passage in heat exchange relation with the sea water into a solution of the refrigerant to produce a solution containing the refrigerant in higher concentration, dividing the concentrated solution from the absorption step into separate components, heating one component with steam while under pressure to drive off vapors, passing said released vapors in heat exchange relation with the remelted ice crystals to heat the water to usable temperature, heating the other component under temperature and pressure conditions to drive off absorbed vapors, recirculating the resulting less concentrated solution from the regenerator to the absorber for reabsorption of additional vapors made available from the vaporizer, passing the vapors released from the second component into heat exchange relation with the vapors during travel from the evaporator to the absorption step to raise the temperature of the latter while cooling the vapors released from the generator, passing the released vapors in heat exchange relation with the ice crystals separated from the brine in the water cycle to melt the ice and condense the vapors into a liquid refrigerant, and advancing the liquid refrigerant to the evaporator for extraction of heat from the sea water, and wherein the steam cycle comprises the steps of passing the steam in heat exchange relation with the concentrated solution of absorbed vapors to regenerate the vapors.

3. The method as claimed in claim 1 in which, in the water cycle, the sea water is cooled by the vaporization of the liquid refrigerant in the crystallizer to a temperature of $24°$ F.$\pm 4°$ F.

4. The method as claimed in claim 1 in which the temperature differential between the refrigerated sea water and the vaporized refrigerant is less than $30°$ F.

5. The method as claimed in claim 1 in which the differential between the refrigerated sea water in the freezer-crystallizer and the vaporized refrigerant is about $8°$ F.

6. The method as claimed in claim 1 wherein, in the refrigeration cycle, the vapors are maintained under a positive pressure for absorption in the weak solution of vapors to increase the concentration of vapors absorbed therein.

7. The method as claimed in claim 1, which, in the refrigeration cycle, includes the step of passing the cold concentrated solution from the absorber into heat exchange relation with the weak solution from the generator to utilize the heat of the weak solution for raising the temperature of the concentrate while utilizing the cold of the concentrate to lower the temperature of the weak solution fed to the absorber.

8. The method as claimed in claim 1 in which the refrigerant employed in the refrigeration cycle is ammonia.

References Cited in the file of this patent

UNITED STATES PATENTS

| | | |
|---|---|---|
| 434,904 | Alford | Aug. 26, 1890 |
| 482,694 | Palson | Sept. 13, 1892 |
| 1,576,136 | Johnson | Mar. 9, 1926 |
| 1,931,347 | Gay | Oct. 17, 1933 |
| 1,985,636 | Foss | Dec. 25, 1934 |
| 2,257,925 | Vretman | Oct. 7, 1941 |
| 2,285,788 | Woodson | June 9, 1942 |
| 2,318,532 | Scott | May 4, 1943 |
| 2,408,480 | Reid | Oct. 1, 1946 |
| 2,507,632 | Hickman | May 16, 1950 |
| 2,559,204 | Wenzelberger | July 3, 1951 |
| 2,613,513 | Shields | Oct. 14, 1952 |
| 2,666,304 | Ahrel | Jan. 19, 1954 |

It will be understood that changes may be made in the details of arrangement and operation, as well as in the relative conditions of operation, without departing from the spirit of the invention, especially as defined in the following claims.